Figure 1:
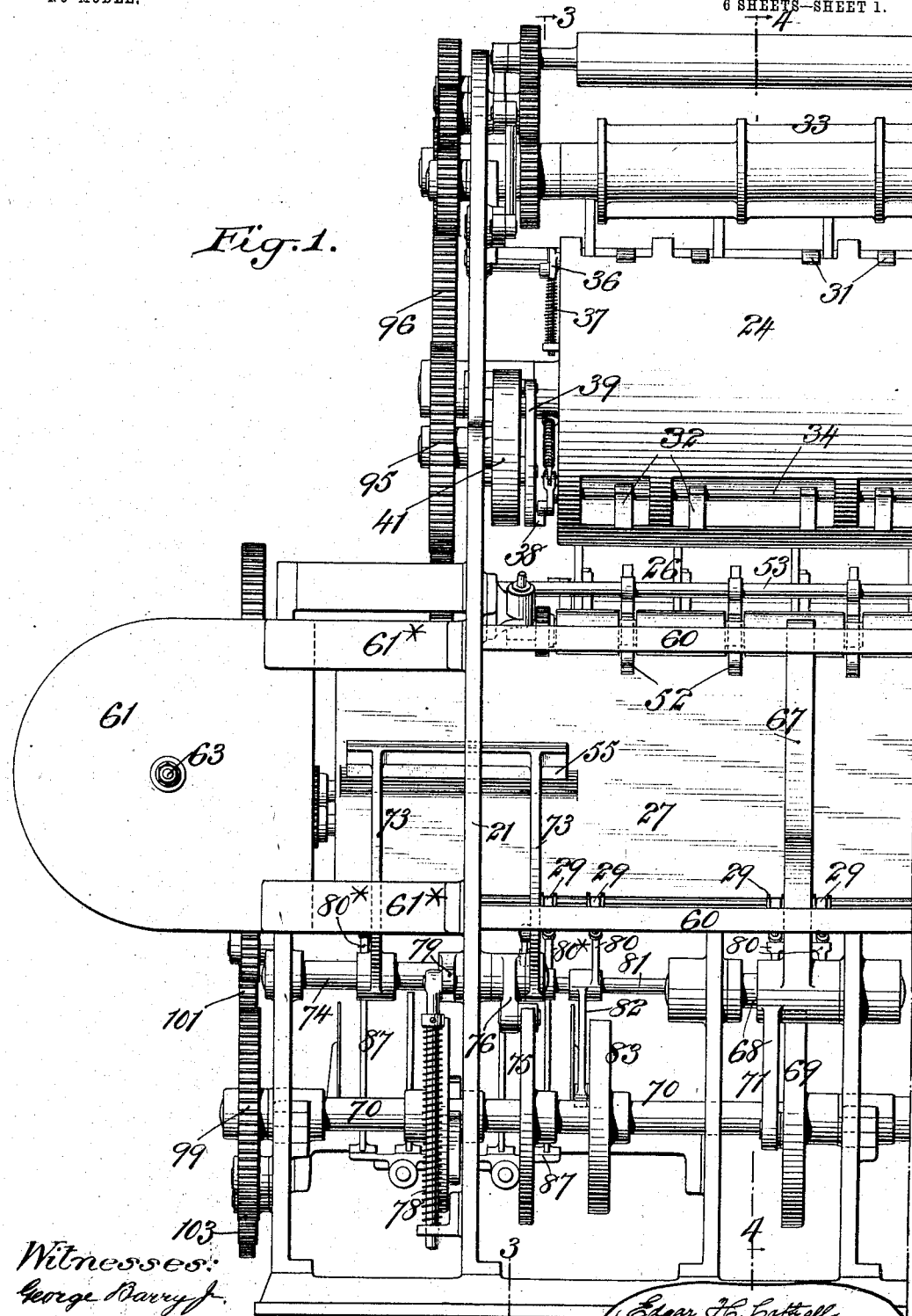

No. 757,274. PATENTED APR. 12, 1904.
E. H. COTTRELL.
MACHINERY FOR CUTTING AND FOLDING PAPER OR OTHER FABRICS.
APPLICATION FILED AUG. 7, 1903.
NO MODEL. 6 SHEETS—SHEET 1.

Witnesses:
George Barry Jr.
Henry Pheme

Inventor:
Edgar H. Cottrell
by attorneys
Brown & Seward

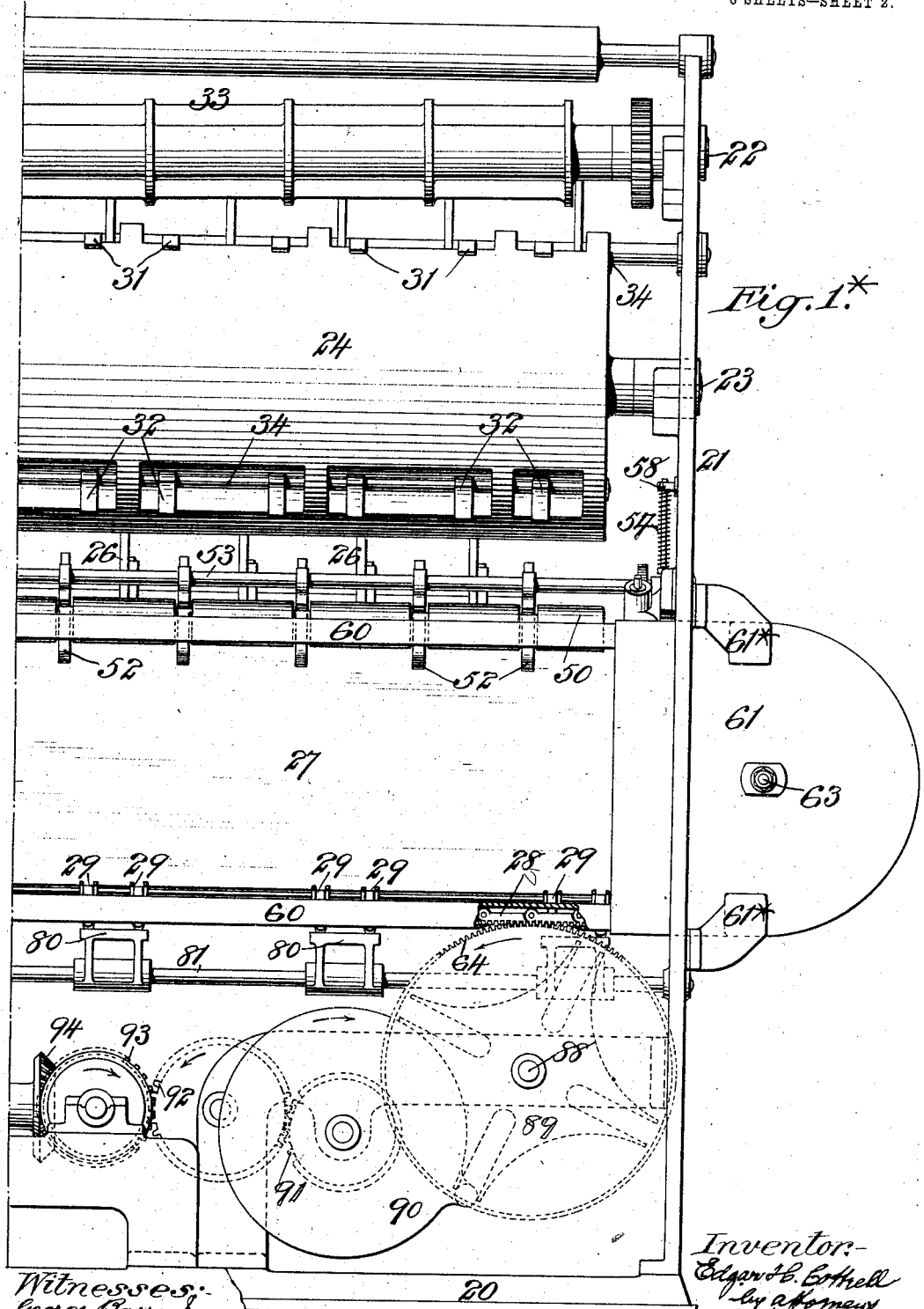

No. 757,274. PATENTED APR. 12, 1904.
E. H. COTTRELL.
MACHINERY FOR CUTTING AND FOLDING PAPER OR OTHER FABRICS.
APPLICATION FILED AUG. 7, 1903.
NO MODEL. 6 SHEETS—SHEET 3.

Witnesses:
George Barry Jr
Henry Thieme

Inventor:
Edgar H. Cottrell
by attorneys
Brown & Seward

No. 757,274. PATENTED APR. 12, 1904.
E. H. COTTRELL.
MACHINERY FOR CUTTING AND FOLDING PAPER OR OTHER FABRICS.
APPLICATION FILED AUG. 7, 1903.
NO MODEL. 6 SHEETS—SHEET 5.
Fig. 4.
Fig. 5.
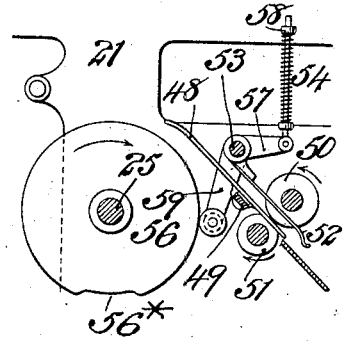
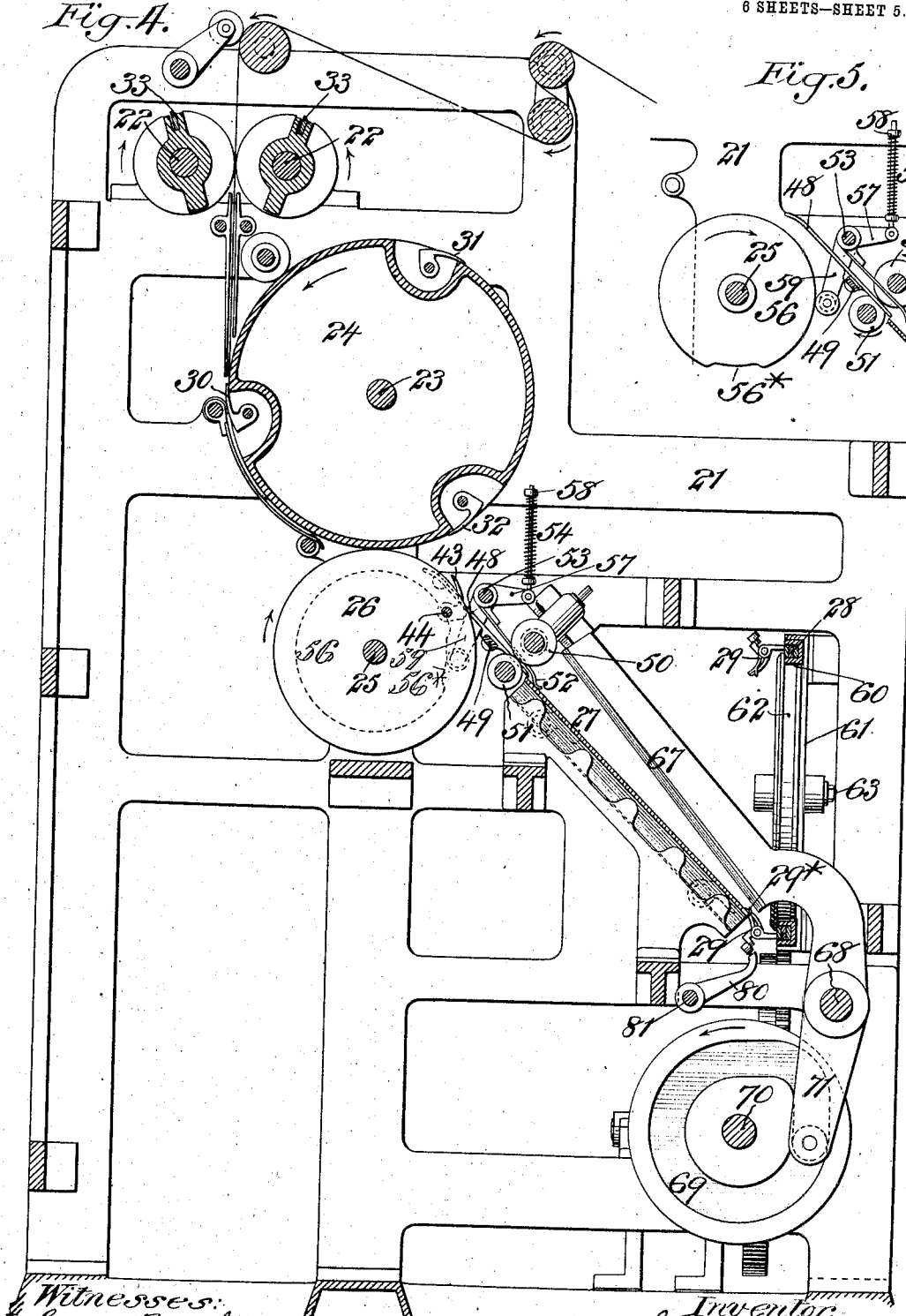
Witnesses:
George Barry Jr.
Henry Thieme
Inventor:
Edgar H. Cottrell
By attorneys
Brown & Seward No. 757,274. PATENTED APR. 12, 1904.
E. H. COTTRELL.
MACHINERY FOR CUTTING AND FOLDING PAPER OR OTHER FABRICS.
APPLICATION FILED AUG. 7, 1903.
NO MODEL. 6 SHEETS—SHEET 6.
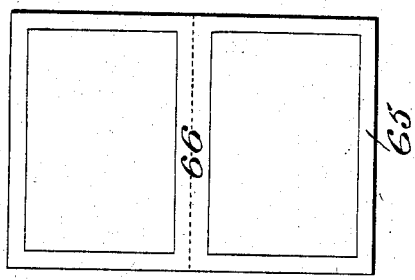
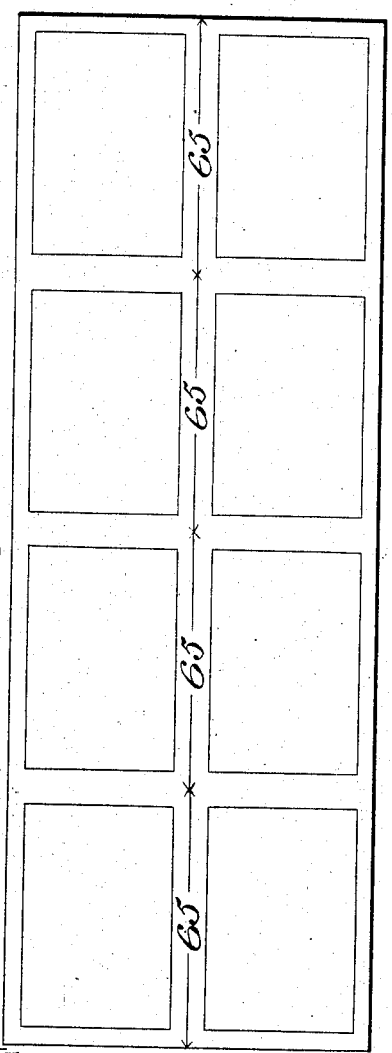
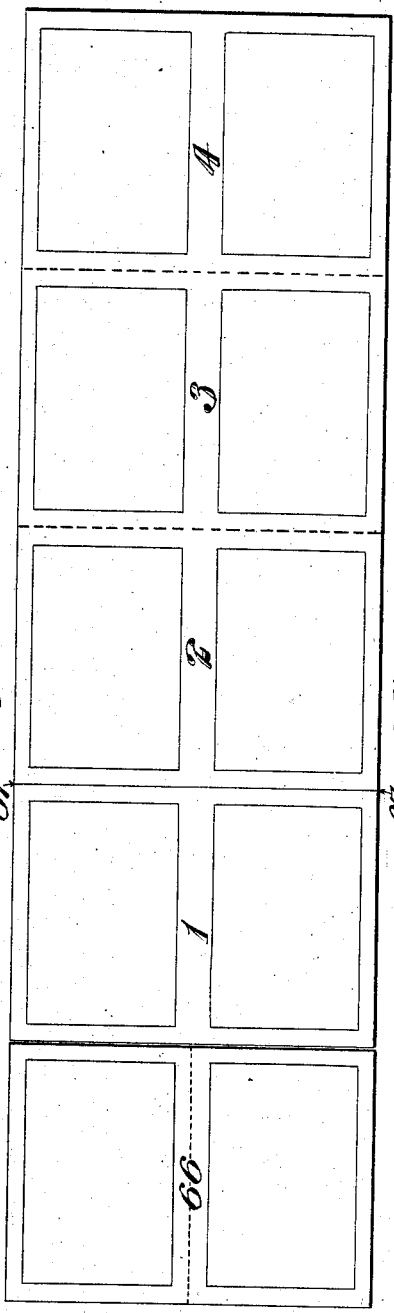
Witnesses:
George Barry Jr
Henry Thieme
Inventor
Edgar H. Cottrell
by attorney
Brown & Seward No. 757,274.

Patented April 12, 1904.

UNITED STATES PATENT OFFICE.

EDGAR H. COTTRELL, OF STONINGTON, CONNECTICUT, ASSIGNOR TO C. B. COTTRELL & SONS COMPANY, OF NEW YORK, N. Y., A CORPORATION OF NEW JERSEY.

MACHINERY FOR CUTTING AND FOLDING PAPER OR OTHER FABRICS.

SPECIFICATION forming part of Letters Patent No. 757,274, dated April 12, 1904.

Application filed August 7, 1903. Serial No. 168,610. (No model.)

*To all whom it may concern:*

Be it known that I, EDGAR H. COTTRELL, a citizen of the United States, and a resident of Stonington, in the county of New London and State of Connecticut, have invented a new and useful Improvement in Machinery for Cutting and Folding Paper or other Fabrics, of which the following is a specification.

The cutting and folding machinery which constitutes this invention is more especially intended to be used in connection with a printing-machine in which the printing of the necessary number of pages for a signature is performed on a continuous web before cutting the latter into sheets.

Machinery embodying the invention in its entirety and in what I consider its most effective form comprises a rotary collecting cylinder or drum for taking sheets cut transversely from a web and collecting and imposing the so-taken sheets one upon another on its periphery, a stationary table arranged below said cylinder and having a downward lateral inclination or slant therefrom, a rotary sheet-carrier between said cylinder or drum and said table for taking the so collected and imposed sheets from said cylinder or drum, rollers and guides between said carrier and table for depositing the said sheets on the latter, and an endless sheet-carrier running along said table in a direction parallel with the lengths of said cylinder or drum and said rotary carrier and having an intermittent movement by which successive deposits of sheets partly overlapping each other are carried in a train and presented together to a cutter by which several of the superposed sheets in the train are cut together to form piles of shorter sheets, which are carried further by the same carrier to a folder which by one fold folds all the sheets of a pile into a signature.

An important feature of novelty in this invention which distinguishes it from prior inventions of my own, which are the subjects of my United States Patents No. 732,338 and No. 732,339, consists in the substitution of the stationary laterally-slanting table hereinabove mentioned for the horizontal table and the horizontal endless moving apron illustrated in said patents, on which the sheets are deposited in the train and along which they are taken by the carrier to the cutter and folder. The lateral slant of the table renders automatic or facilitates the proper alinement and lateral register of the sheets because of the natural tendency of the sheets when liberated upon the table to descend it by gravitation to stops provided on the said endless carrier for such alinement and register.

Other features of the invention consist in certain changes hereinafter described and claimed which the substitution of said slanting table has made desirable, but which may be to a certain extent applicable in connection with the table or apron described in the patents above mentioned.

Figure 2:
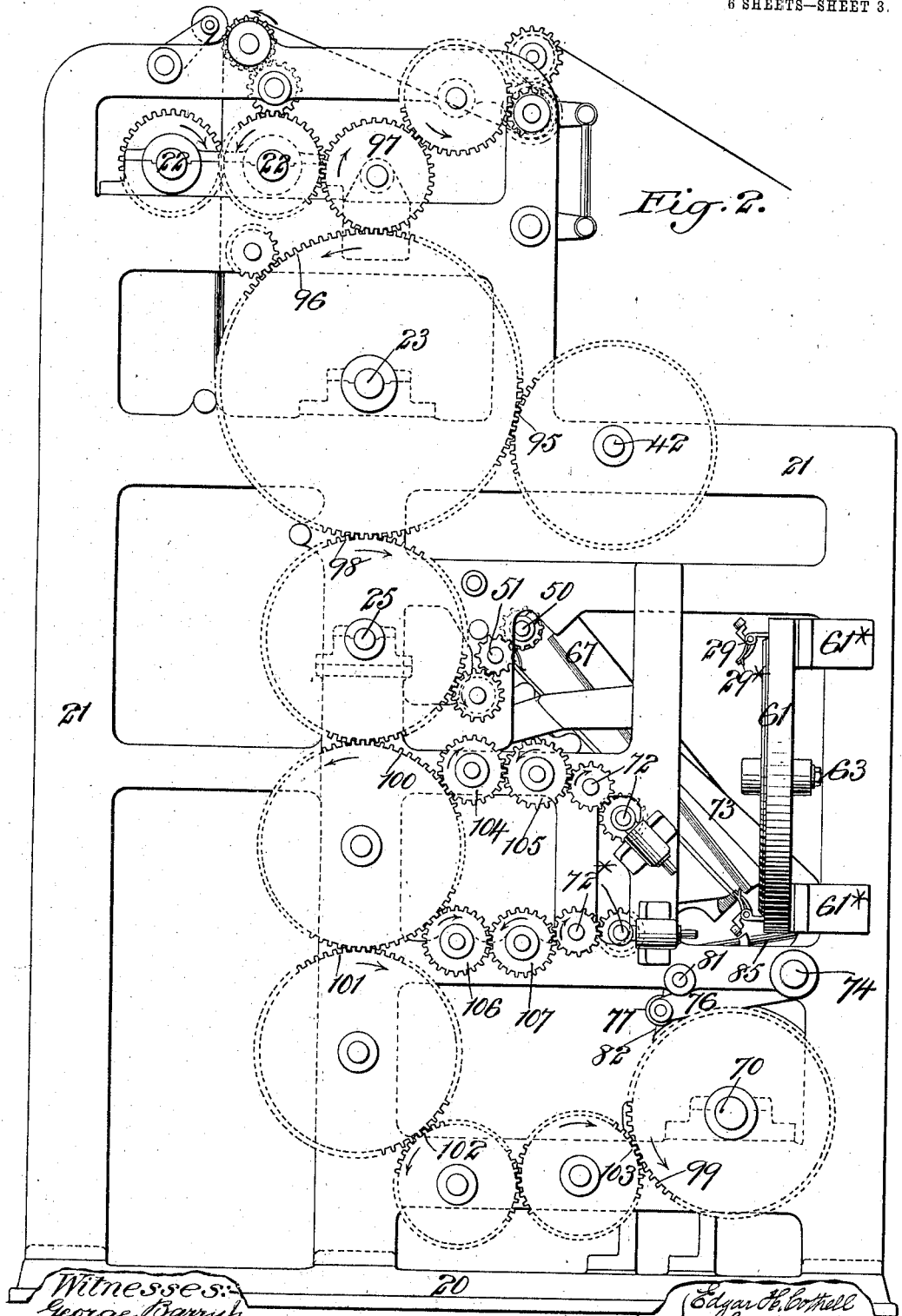
Figure 3:
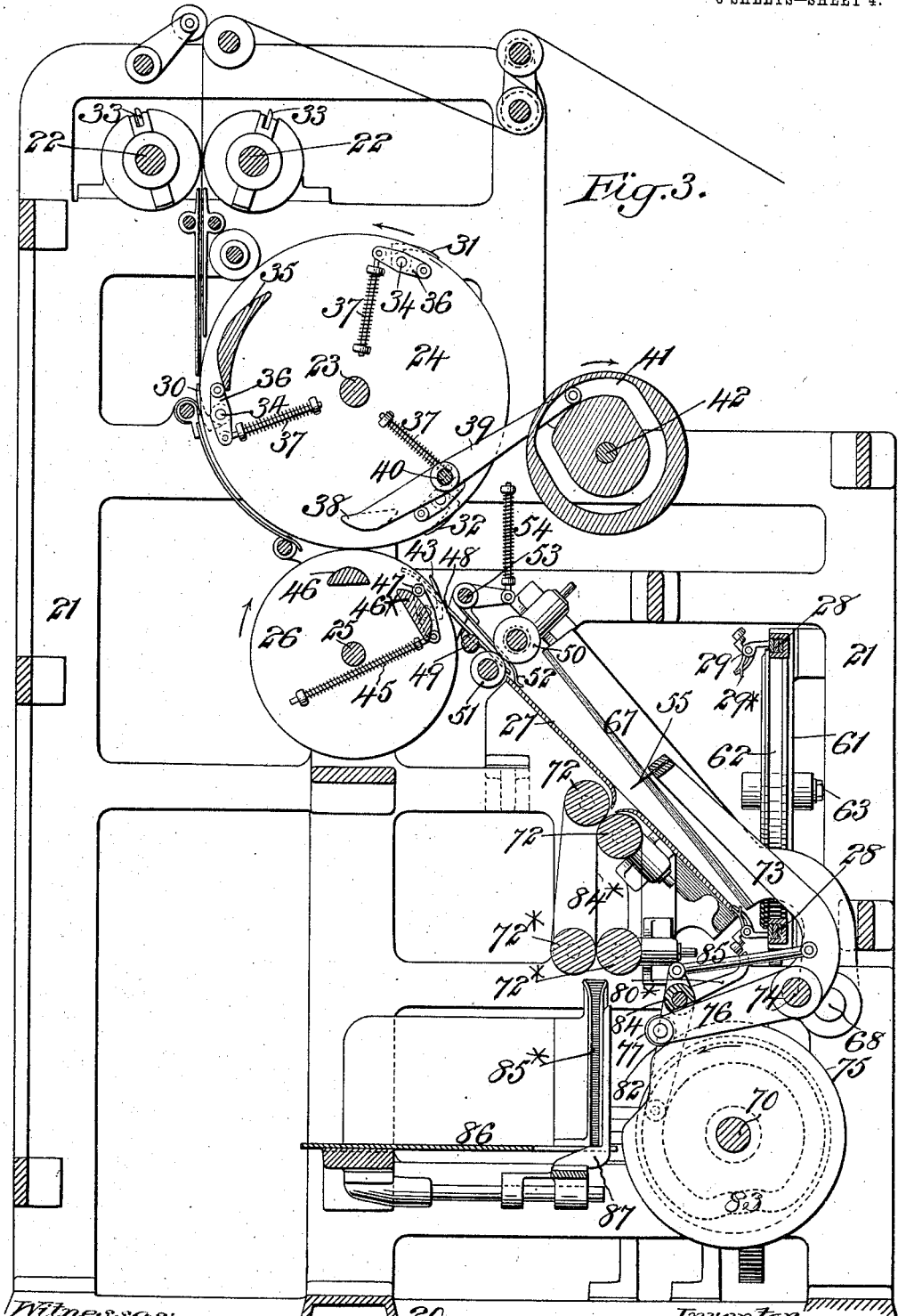

In the accompanying drawings, Figures 1 and 1* together represent a front elevation of cutting and folding machinery embodying my invention; Fig. 2, a left-hand side view of the same; Fig. 3, a transverse vertical section in the line 3 3 of Fig. 1; Fig. 4, a transverse vertical section in the line 4 4 of Fig. 1; Fig. 5, a sectional view of certain details which are less clearly represented in Fig. 4; Fig. 6, a plan view of one of the printed sheets cut from a web and collections of which the example of the invention represented is adapted to cut into smaller sheets and fold; Fig. 7, a plan view of one of such smaller sheets; Fig. 8, a plan view of a train of the printed sheets shown in Fig. 6, illustrating the order of their passage to the cutter and folder for the production of signatures; Fig. 9, an edge view corresponding with Fig. 8.

20 is the bed-plate supporting the main framing 21, in or on which are the bearings for the cutter-shafts 22, for the shaft 23 of the collecting cylinder or drum 24, hereinafter termed the "cylinder," and for the shaft 25 of the rotary sheet-carrier 26, hereinafter referred to as the "reel," which is furnished with grippers for taking the collections of sheets from the cylinder 24 and depositing them upon the stationary slanting table 27, which is suitably supported in the framing 21. The reel 26 is arranged directly under the cylinder, and the stationary table 27, which is arranged at one side of the cylinder and reel, has its upper edge at a level slightly below that of the axis of the reel and has, as shown in Figs. 3 and 4, a lateral inclination downward and outward from said cylinder and reel.
The length of the cylinder is at least equal to the width of the web from which the sheets are to be cut. The width of the table is slightly less than the length of web required for the sheets, and the length of the said table, which runs parallel with said cylinder, is greater than the length of the cylinder, so that at one end it extends, as shown in Fig. 1, a sufficient length beyond the corresponding end of the cylinder to take in the folder 55. Opposite the lower edge of the table is the lower horizontal run of the sheet-carrier, which consists of an endless rack 28 and attached grippers 29.

The collecting-cylinder 24 is furnished with grippers 30 31 32, Figs. 3 and 4, for collecting upon it and imposing one upon another in couples the sheets cut by the rotary cutter 33, said grippers being carried by shafts 34, arranged lengthwise in the cylinder. In the example represented, in which the cylinder is of a circumference equal to the length of web required for three sheets, there are three sets of grippers. For the purpose of opening the grippers to receive sheets from the cutter there is provided a stationary cam 35, against which run rollers on the ends of levers 36, provided on the gripper-shafts 34. The closing of the grippers is effected in a well-known manner by springs 37. For the purpose of opening the grippers to liberate the imposed couples of sheets there is provided, as described in my patents hereinbefore referred to, a tripping-cam 38, Fig. 3, under which the rollers on the gripper-shaft levers pass in the revolution of the cylinder, the said cam being carried by a lever 39, which works on a stationary fulcrum 40 and which at proper times for liberating the sheets is thrown into operative position by a cam 41 on a rotary shaft 42, which is arranged in suitable bearings and which makes one revolution for every two-thirds of a revolution of the cylinder.

The reel 26 may be, for the sake of lightness, of skeleton construction. It is represented as composed of a number of disks 26, fastened upon the shaft 25. The said reel is represented as furnished with a single set of grippers 43 and as geared with the cylinder to make one revolution for every two-thirds of a revolution of the latter. The grippers 43 are like those commonly employed on the cylinders of printing and folding machines, being carried by a shaft 44, arranged in bearings in the reel, and they are provided, as is common and shown in Fig. 3, with springs 45 for closing them. For opening these grippers to receive the collections of sheets from the cylinder 26 there is provided a stationary cam 46, and for again opening them to liberate the sheets in time for deposit upon the table 27 there is another stationary cam 46*, a roller 47, provided on the shaft of the said grippers, being carried over these cams at the proper times, respectively, to effect the openings.

Between the reel 26 and the upper edge of the table 27 there is a set of sheet-supports 48, carried by a stationary bar 49, which runs the whole length of the reel and cylinder and is supported in the framing 21. These sheet-supports have their faces tangential to the reel and have a slant corresponding with that of the table. There is also arranged between the reel and table a pair of rolls 50 51 for carrying the sheets over the said supports from the reel to the table. These rolls are supported in suitable bearings in the framing and are driven at suitable speed. Besides the sheet-supports 48 and the rolls 50 51 there are between the reel and the table knockers or pressers 52, which are brought down upon the upper edges of the sheets for the purpose of preventing them from rising from the table when their lower edges strike and are stopped by the stops 29*, provided on the grippers 29 of the sheet-carrier. The said pressers 52 are carried by a rock-shaft 53, which is supported in suitable fixed bearings, and they are operated by a spring 54 under the control of a cam 56, Fig. 5, on the shaft 25 of the reel 26, the said spring acting between an arm 57 on said rock-shaft and a fixed bearing 58 on the framing, and the said cam acting on another arm 59 on the rock-shaft. The spring keeps the pressers raised at all times except just when the sheets after having run past the rolls 50 51 and down the slanting face of the table have been stopped by their lower edges coming in contact with the stops on the rack-grippers, at which time the depression 56* of the cam 56 passes the arm 59 of the rock-shaft 53 and allows the spring to bring down the pressers upon the sheets. In order to permit the sheet-supports 48 to project between the rolls 50 51 as far as the upper edge of the table and the pressers 52 to project between said rolls and over the said edge, the said rolls are grooved circumferentially at proper intervals, where said supports and pressers intervene.

The carrier, consisting of the endless rack 28, with attached grippers 29, may be and is represented of known construction. The said rack is arranged opposite the face of the table, where it runs in slideways 60 in a stationary frame 61, supported in brackets 61* on the main framing, and it is carried by upright wheels 62 on axles 63, supported in said frame 61, and is driven intermittently by a spur-gear 64, as will be hereinafter described. It is the lower run of this carrier which is the operative portion, running, as it does, in proximity to the lower edge of the table 27.

The grippers 29 are in such number and so spaced that there may be two to receive each of as many of the shorter sheets 65, Fig. 7, or of the uncut sections 65 of the longer sheets, Fig. 8, which are to form said shorter sheets, as may be at any time presented one before another on the table 27, which in the example represented makes eight of said grippers to be included within the length of the cylinder and two for the portion of the table which extends beyond the length of the cylinder and which takes in the folder 55 by which the folding of the piled sheets 65 on the line 66 to form signatures is effected. The grippers represented (see Figs. 3 and 4) are of the kind which constitute part of the subject-matter of my United States Letters Patent No. 732,338, being, as hereinbefore mentioned, provided with stops 29* and being closed by springs applied on their pivots, said stops serving to arrest the sheets in their descent after their liberation from the rolls 50 51, and so to preserve the alinement of the successively-deposited sheets.

The cutter hereinbefore mentioned for cutting the long sheets, such as are represented by Fig. 6, into the shorter sheets 65 is represented as consisting of a chopping-blade 67, arranged crosswise of the table and carried by a rock-shaft 68, arranged in suitable bearings in the lower part of the framing. Its location relatively to the length of the cylinder and table is, as may be understood by reference to Figs. 1 and 1*, that its edge which works through a slot in the table is so located that it will cut from a couple or collection of the long sheets taken from the cylinder 24 and deposited upon the table one of the sections 65 of each of said sheets. The said rock-shaft 68 derives its movement from a cam 69 (see Fig. 4) on a shaft 70, which rotates continuously at the same speed as the shaft 25 of the reel 26, the said cam operating upon an arm 71 of said rock-shaft.

The folder 55, hereinbefore mentioned, which folds into one signature a pile of several of the sheets 65, cut by the cutter 67 from several deposits of the longer sheets, Fig. 6, consists of a blade which works through a slot provided for it along the center line of the table and coöperates with the rollers 72, Fig. 3, arranged in bearings under or behind the table, the said blade being carried by the arms 73 of a rock-shaft 74, arranged in bearings below the table and being actuated by a cam 75 on the rotary shaft 70, before described, said cam acting against a roller 77 on an arm 76 of said rock-shaft 74, the roller being kept in contact with the periphery of said cam by means of a spring 78, Fig. 1, which acts on another arm 79 of said rock-shaft 74. Below the said rolls 72 there are represented in Fig. 3 other two rolls 72*, on which and said rolls 72 run tapes 84*, which carry the folded signatures down through upright guides 85* to a packing-table 86, on which they are packed by a reciprocating packer 87; but as this table and packer do not constitute parts of this invention no particular description of them is necessary.

For opening the grippers 29 to receive the successive deposits of sheets upon the table there are provided a series of knockers 80, Figs. 1, 1*, and 4, which are fast upon a rock-shaft 81, supported in fixed bearings below the table, said knockers being in such number and so arranged on said rock-shaft as to act upon as many of the grippers as are opposite the cylinder during any intermission of the movement of the carrier. For operating this rock-shaft and said knockers 80 said rock-shaft has an arm 82, which engages, as shown in dotted outline in Fig. 3, with a cam 83 on said rock-shaft. For opening the two grippers, which during a movement of the carrier have passed beyond the cylinder and are stationary opposite to the folder 55 during the next intermission of the carrier movement, there are two knockers 80*, Figs. 1 and 3, carried by a sleeve 84, which is loose on the rock-shaft 81 and is connected by a rod 85 with one of the folder-arms 73, so that just as the folder is coming into operation the last-mentioned two grippers are opened to liberate the cut sheets which have been presented to the folder.

The spur-gear 64, hereinbefore mentioned, for driving the carrier-rack 28 is represented (see Fig. 1*) as carried by a shaft 88 and as having the necessary intermittent motion imparted to it in the same manner as the endless rack-carrier described in my United States Patents Nos. 732,338 and 732,339, hereinbefore referred to—that is to say, by the mechanical device 89 90, resembling what is known as the "Geneva stop," the wheel 90 deriving constant rotary motion through gears 91 92 93 94 from the rotary shaft 70.

The driving of the several shafts 22 23 25 42 70 and rolls 72 72* may be effected in any suitable manner by properly-proportioned gearing—for example, as represented in Fig. 2, in which the shaft 42 is represented as the driver and supposed to be driven by suitable gearing from a printing-machine, to which this cutting and folding machinery is an appurtenance. The shaft 23 of the collecting-cylinder is driven by a gear 95 on said shaft 42, meshing with a gear 96 on said cylinder. This gear 96 drives the cutter-shafts 22 through an intermediate gear 97 and drives the reel-shaft 25 by meshing directly with a gear 98 thereon, and motion is transmitted from this gear 98 to a gear 99 on the shaft through a train of gears 100 101 102 103. The rolls 72 are geared together and driven by the gear 100 through gears 104, and the rolls 72* are geared together and driven by said gear 100 through gears 106 107. The said gears 98

100 101 102 103 104 105 106 107 are represented as running loosely on studs affixed to the framing 21.

Having described the several parts of the machinery and their respective and relative movements, I will in conclusion describe their successive operations.

The sheets cut from the web by the cutter 33 are collected in couples upon the cylinder 24, three couples during every two revolutions of said cylinder, and these couples are taken from the cylinder by the reel 26, one couple for each revolution of said reel. These couples are taken from the reel by the rolls 50 51 and deposited upon the table 27 while the carrier is stationary between its successive movements and the grippers which have arrived in proper positions in its lower run are open. The grippers being closed after each deposit, the successive deposits are carried along the table by the succeeding movements of the carrier in the form of a train in which each couple, as shown in Fig. 9, overlaps its predecessor to the extent of one of the sheet-sections 65, and after four deposits have been made there will be beyond the line of the cutter 67 four couples of these sections, the first of which couples, numbered 1 in Fig. 9, formed of the tail part of the first deposit, would have been cut off by a preceding descent of the cutter 67, the position of the edge of which is indicated by the line 67 in Fig. 8. The next descent of the cutter cuts off three couples of sheet-sections—viz., one couple from each of the second, third, and fourth deposits, numbered, respectively, 2 3 4 in Figs. 8 and 9. The next movement of the carrier takes the pile of four couples of cut sections or sheets 65 to the portion of the table beyond the cylinder, where by the descent of the folding-blade they are all folded together in the line 66 into a signature of thirty-two pages. This pile in the position in which it is brought for folding is shown at the left-hand end of Figs. 8 and 9. After the fourth deposit on the table the operation of the machine is a repetition of that described, a signature being produced after every movement of the carrier by the operations of the cutter and folder.

It will be readily understood by those skilled in the art how this machinery may be adapted to the production, from sheets containing a greater or less number of pages, signatures consisting of a greater or less number of sheets and pages.

What I claim as my invention is—

1. The combination of a rotary cylinder for collecting a plurality of sheets one upon another on its periphery, a stationary table arranged below and having a slant downward and outward from said cylinder, and sheet-carrying devices between said cylinder and the upper edge of said table for taking the collections of sheets from said cylinder and presenting them upon said table.

2. The combination of a rotary cylinder for collecting a plurality of sheets one upon another on its periphery, a rotary carrier furnished with grippers for taking the collections of sheets from said cylinder, a table having a downward slant laterally from said cylinder and carrier, and rollers arranged between said carrier and the upper edge of said table for receiving the collections from said carrier and presenting them upon said table.

3. The combination of a rotary cylinder for collecting a plurality of sheets one upon another on its periphery, a rotary carrier furnished with grippers for taking the collections of sheets from said cylinder, a table having a downward slant laterally from said cylinder and carrier, rollers at the upper edge of said table for depositing thereon sheets taken from said carrier, and stationary sheet-supports between said carrier and rollers.

4. The combination of a slanting table for receiving sheets, means for depositing sheets on said table from the upper edge thereof, and an intermittently-moving sheet-carrier running along the lower edge of said table.

5. The combination of a slanting table and means for depositing sheets thereon from the upper edge thereof, an intermittently-moving sheet-carrier running along the lower edge of said table, and stops on said carrier for arresting said sheets in their descent on the table and alining them.

6. The combination of a slanting table for receiving sheets, means for depositing sheets on said table from the upper edge thereof, and an intermittently-moving carrier running along the lower edge of said table and consisting of an endless rack furnished with grippers which have stops for arresting the sheets in their descent on said table and assuring the alinement of successive deposits, 7. The combination of a slanting table for receiving sheets, means for depositing sheets on said table from the upper edge thereof, an intermittently-moving carrier running along the lower edge of said table, and pressers at the upper edge of said table for pressing down thereon the upper parts of the sheets when their lower edges reach the carrier.

8. The combination of a slanting table for receiving sheets, an intermittently-moving sheet-carrier running along the lower edge of said table, means for depositing sheets upon said table from the upper edge thereof during the intermissions of the movement of said carrier, and a cutter for cutting the so-deposited sheets into smaller sheets during said intermissions of movement.

9. The combination of a slanting table for receiving sheets, an intermittently-moving sheet-carrier running along the lower edge of said table, means for making successive deposits of sheets one upon another upon said table from the upper edge thereof during successive intermissions of the movement of said carrier, a cutter for cutting on said table a number of said successive deposits into smaller sheets and a folder for folding together on said table a number of the so-cut smaller sheets.

10. The combination of a slanting table for receiving sheets, means for depositing sheets upon said table, and an intermittently-moving sheet-carrier comprising an endless rack and attached grippers arranged opposite the face of said table with the lower run of the rack opposite to and in operative proximity to the lower edge of said table.

11. The combination of a slanting table, means for depositing sheets on said table from the upper edge thereof, an intermittently-moving sheet-carrier comprising an endless rack furnished with grippers and running along the lower edge of said table, a rock-shaft furnished with knockers for opening said grippers for the reception of sheets during the intermissions of the movement of said carrier, and a rotary cam for actuating said rock-shaft.

12. The combination of a slanting table, means for depositing sheets on said table from the upper edge thereof, an intermittently-moving sheet-carrier comprising an endless rack furnished with grippers and running along the lower edge of said table, a folding-blade coöperating with said table, a supporting-shaft and knockers thereon for opening said grippers and a connection between said folding-blade and knockers for actuating said knockers with the movement of the blade.

13. The combination of a slanting table, means for depositing sheets on said table from the upper edge thereof, an intermittently-moving sheet-carrier comprising an endless rack and attached grippers and running along the lower edge of said table, a folding-blade coöperating with said table, a rock-shaft and knockers fast thereon for opening said grippers for the reception of sheets, a rotary cam for actuating said rock-shaft, other knockers loose on said rock-shaft for opening said grippers for liberating the sheets, and a connection between said other knockers and the folding-blade for actuating said knockers.

In testimony that I claim the foregoing as my invention I have signed my name, in presence of two witnesses, this 4th day of August, 1903.

EDGAR H. COTTRELL.

Witnesses:
 FREDK. HAYNES,
 HENRY THIEME.